United States Patent
Yanagita et al.

(10) Patent No.: US 7,860,609 B2
(45) Date of Patent: Dec. 28, 2010

(54) ROBOT MULTI-ARM CONTROL SYSTEM

(75) Inventors: Akihiro Yanagita, Orion Township, MI (US); Jianming Tao, Troy, MI (US); Tien L. Chang, Troy, MI (US); Ho Cheung Wong, Troy, MI (US); H. Dean McGee, Rochester Hills, MI (US); Chi-Keng Tsai, Bloomfield Hills, MI (US); Sai-Kai Cheng, Rochester Hills, MI (US); Steven E. Nickel, Livonia, MI (US); Hadi Akeel, Sterling, VA (US)

(73) Assignee: Fanuc Robotics America, Inc., Rochester Hills, MI (US)

( * ) Notice: Subject to any disclaimer, the term of this patent is extended or adjusted under 35 U.S.C. 154(b) by 1273 days.

(21) Appl. No.: 11/381,589

(22) Filed: May 4, 2006

(65) Prior Publication Data
US 2006/0287769 A1 Dec. 21, 2006

Related U.S. Application Data

(60) Provisional application No. 60/679,919, filed on May 6, 2005.

(51) Int. Cl.
*G06F 19/00* (2006.01)
*G06F 15/16* (2006.01)
(52) U.S. Cl. .................. 700/245; 700/212; 709/248
(58) Field of Classification Search .............. 700/245
See application file for complete search history.

(56) References Cited

U.S. PATENT DOCUMENTS

| 5,889,924 | A | 3/1999 | Okabayashi et al. | |
|---|---|---|---|---|
| 6,330,493 | B1 | 12/2001 | Takahashi et al. | |
| 6,434,448 | B1 * | 8/2002 | Kosaka et al. | 700/245 |
| 6,535,926 | B1 * | 3/2003 | Esker | 709/248 |
| 6,760,687 | B2 | 7/2004 | Apel et al. | |
| 6,804,580 | B1 | 10/2004 | Stoddard et al. | |
| 6,807,461 | B2 | 10/2004 | Kneifel, II et al. | |
| 2002/0183864 | A1 | 12/2002 | Apel et al. | |
| 2003/0033052 | A1 * | 2/2003 | Hillen et al. | 700/212 |
| 2005/0055132 | A1 | 3/2005 | Matsumoto et al. | |
| 2006/0184272 | A1 * | 8/2006 | Okazaki et al. | 700/245 |

FOREIGN PATENT DOCUMENTS

| EP | 1 464 452 | 10/2004 |
|---|---|---|
| JP | 2001/150372 | 6/2001 |
| JP | 2002/073127 | 3/2002 |
| JP | 2003/145462 | 5/2003 |
| WO | WO 2004/114037 | 12/2004 |

\* cited by examiner

*Primary Examiner*—Khoi Tran
*Assistant Examiner*—Ian Jen
(74) *Attorney, Agent, or Firm*—Fraser Clemens Martin & Miller LLC; William J. Clemens

(57) ABSTRACT

A robot multi-arm control system includes robot controllers that communicate via a network to transmit synchronization information from a master controller to one or more slave controllers in order to coordinate manufacturing processes. The system accounts for the network communication delay when synchronizing the event timing for process and motion synchronization.

22 Claims, 8 Drawing Sheets

ROBOT MULTI-ARM CONTROL SYSTEM

CROSS-REFERENCE TO RELATED APPLICATION

This application claims the benefit of U.S. provisional patent application Ser. No. 60/679,919 filed May 6, 2005.

BACKGROUND OF THE INVENTION

The present invention relates to an apparatus and a system for controlling multiple robots in coordinated or collaborative motion.

The present invention also relates to coordinating the timing of commands issuing from electronic controllers connected in a network. More particularly it pertains to actions or events performed by actuators, such as robot arms, in response to commands from a controller, which commands are synchronized with commands produced by at least one other controller.

As robot systems become more sophisticated, a need arises for multiple robots to work together on a given task. For example if one robot is holding a workpiece on which another robot will perform an operation, the motions of both robots must be precisely coordinated to efficiently accomplish that task.

The conventional way to accomplish close coordination of robot manipulators is to connect them to the hardware of the same controller. This technique can be applied to a limited number of axes of motion or degrees of freedom. It is difficult for a robot manufacturer to provide all of the possible combinations and permutations of groups of robot manipulators and servo systems.

To overcome these shortcomings, multiple controllers can be used to control a multi-armed system of robot manipulators. Each controller and manipulator in the system can be generic, and the number of robots in the system can be very large because of the flexibility of networked controllers. But each controller requires an independent timing system, a principal shortcoming of this approach. To make full use of the capabilities of a multi-robot system, a common time reference is preferred.

Some prior art systems provide common timing through the use of hardware, a technique that requires the clocks of all of the robot controllers be interconnected. One such hardware mechanism, embodied in IEEE-1588 protocol, employs a specific mechanism to provide common timing in hardware. Another mechanism in the prior art involves highly precise clock circuits. The hardware required for each of these is specialized and expensive.

SUMMARY OF THE INVENTION

Although hardware can be used to coordinate timing that is accurate to within microseconds among electronic controllers interconnected by a communications network, that degree of accuracy is not necessary in systems for controlling industrial robots.

The present invention provides common timing information among the controllers in software via a standard multi-purpose communications network. No special hardware is required. The clock on each controller need not be precise, and it may run independently of the clock on any other controller. Slave or shadow controllers communicate with a master controller to periodically determine timing corrections, which are used to update a shadow tick count on the slave controllers. This technique enables event command signals produced by each networked controller to be synchronized within a few milliseconds of each other.

A method and system according to the present invention can be applied to a controller of robots and to other actuators and manipulators that respond to electronic command signals.

A method according to this invention synchronizes the occurrences of events in a system of controllers interconnected by a communications network. The method includes the steps of maintaining on a master controller and a slave controller a respective count of ticks produced by a clock on each controller. A target tick count at which a future event is to occur is established. The slave controller repetitively sends an inquiry to the master controller for the current tick count on the master controller, and the master controller responses to the slave controller with the current tick count on the master controller. On the basis of the current tick count transmitted from the master controller and the length of the inquiry-response transmission period, a shadow tick count on the slave controller is established and incremented by the clock ticks on the slave controller. The master controller commands the event upon the occurrence of the target tick count on the master controller, and the slave controller commands the event when the shadow tick count matches the target tick count.

The present invention concerns a method of guided programming of computer controlled machines including robots and other manipulators and devices. The programming method includes guide rules that govern the behavior of the execution of the programs. The programs can control motion of the machines. The programs can also control application processes that may or may not involve motion. An application process is a general term that relates to the process required to complete the task. The application process may or may not involve motion during the execution of the task.

The guide rules can define time based synchronization. Many times the desired synchronization is the earliest time that all robots and processes in the system are ready. The guide rules can define that the family head will communicate the starting time, relative to a common time. This can allow for anticipation of communication delay.

The guide rules according to the present invention perform the following functions: 1) Define the robots in the family; 2) Process synchronization; 3) Handle exceptions (errors); 4) Forward program execution; 5) Backward program execution; 6) Line-by-line program synchronization; and 7) Motion synchronization

DESCRIPTION OF THE DRAWINGS

The above, as well as other advantages of the present invention will become readily apparent to those skilled in the art from the following detailed description of a preferred embodiment when considered in the light of the accompanying drawings in which.

DESCRIPTION OF THE PREFERRED EMBODIMENT

U.S. provisional patent application Ser. No. 60/679,919 filed May 6, 2005 is hereby incorporated herein by reference.

Figure 1:
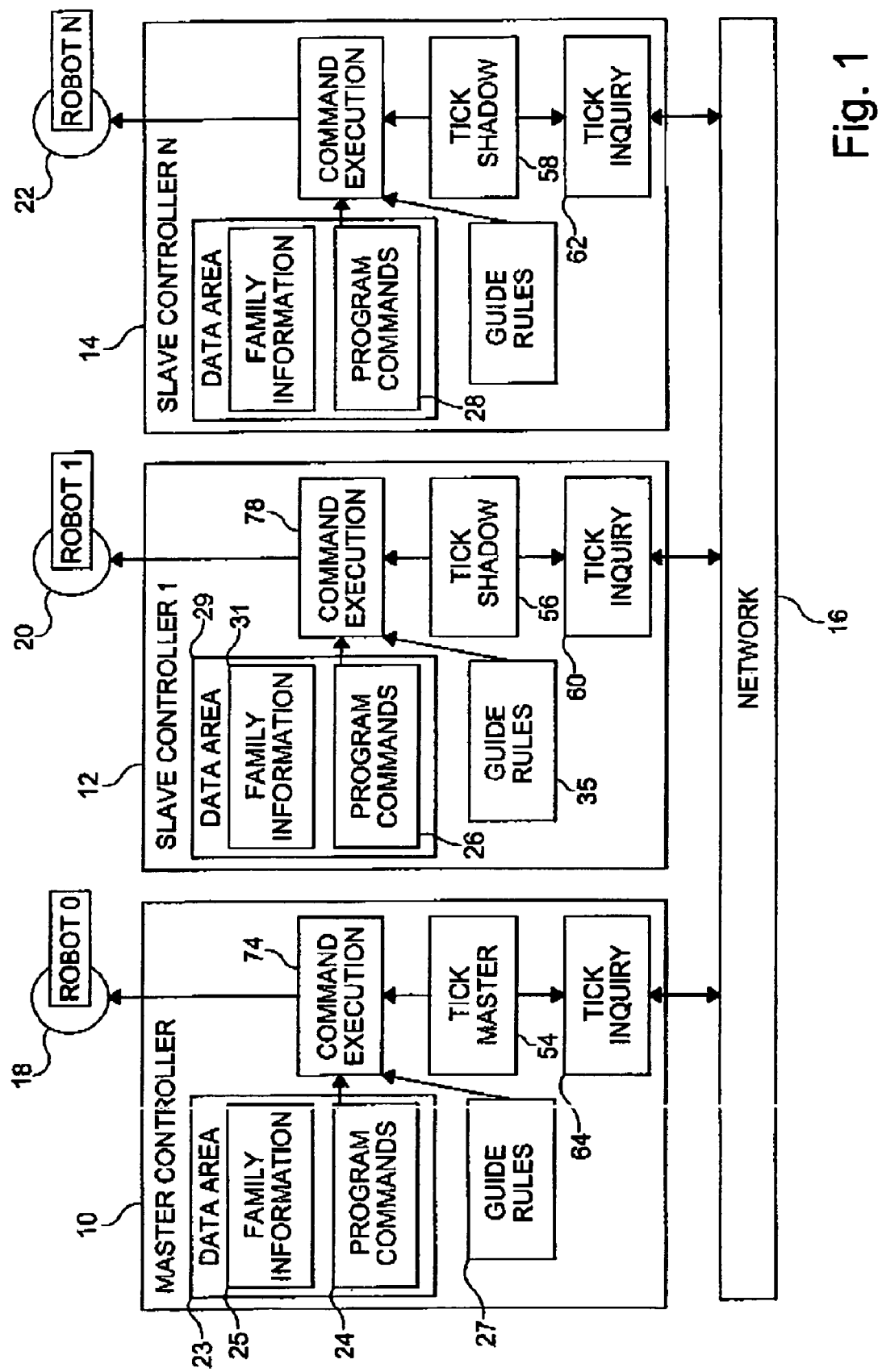
FIG. 1 is a general schematic diagram of a multiple robot system to which the present invention can be applied.

The present invention utilizes the method of synchronizing the occurrences of events in a system of controllers interconnected by a communications network described in the copending U.S. patent application Ser. No. 11/069,126, filed Mar. 1, 2005, issued Dec. 12, 2006 as U.S. Pat. No. 7,149,606, and incorporated herein by reference. Referring to FIG. 1, a system includes an indefinite number "N" of robot controllers 10, 12, 14 interconnected by a communications network 16, which may be a wireless, optical, or wired network. The controller 10 is a master controller; controllers 12, 14 are shadow controllers. Although FIG. 1 illustrates a system in which each robot controller 10, 12, 14 communicates with one robot 18, 20, 22 respectively, each controller may communicate with several robots. Movement of the robots associated with a respective controller is controlled by commands, preferably in the form of electronic signals that issue repetitively from each controller and are sent to the associated robots. The system coordinates the issuance of the commands from each controller 10, 12, 14 so that each robot of the system receives a command from its respective controller substantially concurrently, such that each robot's movement is synchronized and coordinated with that of the other robots of the system.

Although the method is discussed with reference to a robotic system, the method can be applied to the control of other kinds of actuators, which react substantially concurrently in synchronized response to commands issuing from multiple controllers, each of which controls at least one such actuator.

Each controller 10, 12, 14 has a command function 24, 26, 28, which produces the robot program commands. The command functions 24, 26, 28 are mutually independent and execute robot control programs, which are sequences of commands that instruct the robots under control of a controller to move to specific locations. The movement of the robots in response to their respective commands is called an event. The program commands 24, 26 are stored in respective data areas 25, 29 of the controllers 10, 12 along with respective family information 25, 31.

Each robot has an arm whose end is supported on several segmented segments connected by articulating joints, which rotate when driven by electric motors in response to the commands from the controller. Articulation of the joints causes the end of the robot's arm to move to a location. Often the robot control programs command additional equipment attached to the robot arm, such as grippers or process equipment. In the case of process equipment, such as paint sprayers, arc welders and the like, the robot motion and the process are closely coupled. For example, a paint sprayer must be actuated to spray paint precisely when the moving robot arm is at a predetermined location adjacent a workpiece to be painted.

Figure 2:
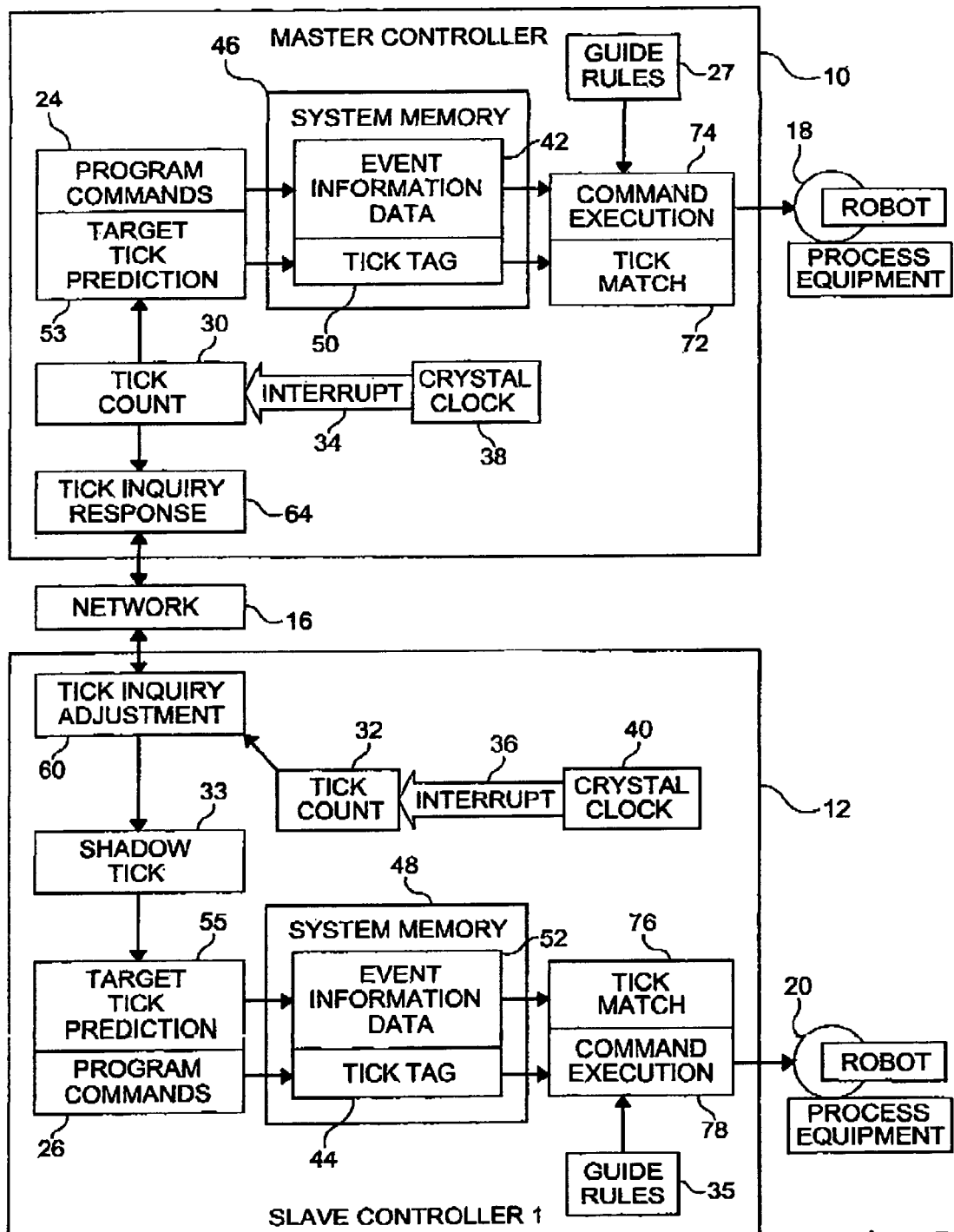
FIG. 2 is a schematic block diagram of the master controller and one slave controller of FIG. 1.

Although FIG. 2 illustrates details of the master controller 10 and one shadow controller 12, the system may include, and the method applies to an indefinite number of shadow controllers. To facilitate precise timing of the actuator commands, coded, computer-readable software resident in each controller provides a tick counter 30, 32, which is coupled by a data bus 34, 36 to a crystal clock 38, 40. Each counter 30, 32, maintains a count of ticks or signals produced by the respective clock 38, 40 at intervals of about every few milliseconds. All of the events that occur in response to a command of each controller 10, 14, 16 are synchronized based on a tick count or shadow tick count on each controller.

Each tick counter 30, 32 provides an integer number that is used by the robot command system to tag event information regarding the event to be executed by the master controller 10 upon the occurrence of a particular count in its tick counter 30 and by the shadow controller 12 upon the occurrence of a particular count in its shadow tick counter 32. Event information 42, 44, which may include the location to which the robot arm is to move at the next event, is resident in controller memory 46, 48. Event information, tagged with a target tick corresponding to the related event, is present at 50, 52 in the corresponding controller memory 46, 48.

The robot command functions 24, 26 are able to predict the target tick count 53, 55 at which a future event will occur. Event information 44 is communicated to the slave controller 12 via the communications network 16 before the event occurs. Preparation of the event information before the event is necessary because standard communications networks have latencies that can exceed twenty milliseconds. Preparation for the event allows all of the controllers to have event information tagged and prepared to trigger at a target tick count before the counters reach each target tick.

The master controller 10 includes a tick master function 54, and the slave controllers 12, 14 each include a tick shadow function 56, 58 as shown in FIG. 1. These functions 54, 56, 58 insure that the tick count 32 on the slave controller is the same as the tick count 30 on the master controller. When robot and process operations need to be synchronized at each controller, the reference tick counts ensure that events occur at the same tick count on each controller.

Tick prediction software repetitively determines the target tick counts at which a system-wide event will occur. It generates the event information and data for each of the system-wide events and tags that information and data with the respective target tick count. That data is communicated to all controllers where it is held until each target tick count occurs. Once the current tick count matches the target tick count, the event triggers and the tagged information and data is executed on all the controller robots at the same tick.

The slave controllers 12, 14 each provide a tick inquiry function 60, 62, which sends a message on the network 16 to the tick inquiry response function 64 on the master controller 10. In response to an inquiry from the slave controllers for the current tick count, the master controller 10 sends the current value of the master tick count 30 to the slave controllers 12, 14.

The inquiry function 60, 62 uses the precise time that the inquiry was sent from the respective slave controller, and the precise time the response was received at the respective slave controller to calculate the length of the transmission period that begins with transmittal of the inquiry and ends with receipt of the response. If the transmission period is longer than a predetermined period, the tick count of the response is disregarded, and a new inquiry is immediately sent. Based on the master tick count response received at each slave controller and the length of the transmission period, a shadow tick count adjustment for each slave controller is calculated as the difference between the master tick count and the slave tick count, plus half the length of the transmission period. This correction or adjustment is applied to the current tick count 32 on each slave controller 12, 14 to determine the shadow tick count 33 on each slave controller. The shadow tick count 33 is thereafter incremented by each tick produced by the clock 40 on the slave controller 12.

To maintain synchronization of the controllers 10, 12, 14, the tick counts 30, 32 on each of the controllers continue to update autonomously, and the shadow tick counts 33, adjusted for the current respective adjustments, update autonomously on the slave controllers 12, 14. Before the target tick count 53 on the master controller 10 is reached, the event command information 42 corresponding to the target tick count will have been identified in the program commands 24 and tagged at 50 with the next target tick count. The tagged event command information 42 on master controller 10 is retained in memory 46 preparatory for the next target tick count to be reached. When the tick count 30 and the target tick count 53 match at 72, the master controller 10 commands execution 74 of the tagged event command information 42 that corresponds to the target tick count 53.

Similarly, before the respective target shadow tick count on each slave controller 12, 14 is reached, the event command information 44 corresponding to the respective target shadow tick count will have been identified in program commands 26 and tagged at 52 with the respective target shadow tick count. The tagged event command information 44 on each slave controller 12, 14 is retained in memory 48 preparatory for the target shadow tick count to be reached. When the shadow tick count 33 and the target tick count 55 on a slave controller 12 match at 76, the slave controller 12 commands execution 78 of the tagged event command information 44 that corresponds to the target tick count 55.

The electronic crystal oscillators in the clocks 38, 40 on the controllers 10, 12, 14 are not precise. Because a standard low-cost hardware system is accurate only to within one part in fifty thousand, over time the tick shadow count 33 will drift with respect to the master tick count 30. In order to accommodate this drift, tick count inquiries are sent periodically to the master controller 10. The tick shadow functions 56, 58 are able to adjust the tick shadow count 33 incrementally to accommodate this clock drift.

Because the clock drift continues at a somewhat constant rate, the adjustment of the tick count occurs at regular intervals. In a typical implementation, the tick count 33 on the slave controller 12, 14 might be adjusted by one tick count about every two minutes of operation. The tick inquiry/adjustment functions 60, 62 on the slave controllers 12, 14 monitor the tick count adjustment and access historical data to determine the average time between adjustments, and the length of the operating period since the last adjustment was made. From this information, the slave controllers 12, 14 estimate the time when the next tick count adjustment will be required. The tick count inquiry from the slave controllers is sent to the master controller at that time.

This estimate is used to calculate the phase of the tick in addition to the magnitude of the required adjustment. Tick match 72 occurs at the instant tick count 30 changes; tick match 76 occurs at the instant tick count 32 changes. Since the controllers all have independent tick counters 30, 32, the tick count 30 on the master controller 10 and the shadow tick count 33 on the slave controllers 12, 14 do not increment at the same instant. This out of phase incrementation can cause an error of plus or minus one tick when the event triggers on the respective controllers. In the best case, the ticks on two controllers increment at exactly the same instant, the error is zero, and the ticks are said to be "in phase." In the worst case, the tick on the shadow controller increments just before or just after the tick on the master controller leading to an error of one tick. The system using this method monitors the clock drift in order to reduce phase error to one half tick or less.

This method addresses the non-deterministic nature of standard low cost networks, such as Ethernet. It is impractical to perform a tick inquiry for every tick count. For example, the tick counter might increment every two milliseconds, but it might take as many as twenty milliseconds to send just one message over a standard communications network.

The present invention concerns a method of guided programming of computer controlled machines including robots and other manipulators and devices. The programming method includes guide rules 27, 35 stored in the data areas 23, 29 that govern the behavior of the execution of the programs. The programs can control motion of the machines. The programs can also control application processes that may or may not involve motion. An application process is a general term that relates to the process required to complete the task. The application process may or may not involve motion during the execution of the task. Examples of application processes include spot welding, arc welding, painting, dispensing, grinding, polishing, material handling, laser cutting and welding. The application process can include any process where there is interaction between the machine and an external object or task.

Different guide rules can be applied to different types of programs. For instance, a spot welding program may have different rules governing motion and process synchronization than an arc welding program. The application process can include motion related to the process, such as weaving or servo gun actuation.

The guide rules can govern the interaction between a group of robots which comprise a family of robots. A family of robots has one robot designated as the family head and the remainder designated as family members. All family members can communicate with the family head and the family head can communicate with all family members. A single program can include multiple robots, but only one robot in a program is designated as a family member.

The guide rules direct the execution of the programs and are associated with each program. The guide rules are stored in a data area which may be attached to the program header, the program itself, or stored external to the program. Multiple rules comprise the set of guide rules. Sub-programs can utilize the rules of the calling program or have their own set of rules that can be applied in addition to or instead of the rules of the calling program.

Different programs in the family of robots can have different sets of guide rules. The guide rules can direct the synchronization of the robot motion. The communication between robots can occur over a computer network, a computer buss, through digital I/O, or through any other means that allows passing of information between computers.

The rules can require that motion of all members of a family of robots start the motion at the same instant. Another rule could require that the motion start at the same instant and end at the same instant. Other rules can determine whether the robot motion is coordinated such that position and velocity are relative to a part being carried by one or more other robots.

Other rules can govern how multiple robots are synchronized with respect to motion of other robots. For instance, arc welding robots may require that all robots be in position before any robot can start a process. This maintains the important gravity related component of arc welding. Spot welding robots, on the other hand, may allow the robots to start a process independent of the state of other welding robots. Spot welding robots may require that any handling robot be stopped during the execution of the spot weld.

The guide rules can synchronize line-by-line forward or backward execution of programs among the family. The guide rules can determine which robots among the family of robots will execute the programs. The guide rules determine the behavior of line-by-line execution of processes.

The rules can define the behavior based on external input such as a user pressing the step forward or step backward key on a teach pendant. The external input can be from a safety signal such as e-stop, teach pendant enable, deadman switch, fence, etc. The external input can also be from the output of a sensor, or an external device.

The guide rules can define the behavior when a motion or process is stopped while executing. The stop condition can be initiated from an external input, or program condition. The stopping sequence can include synchronization of start of motion deceleration. It can include synchronization of end of deceleration. This synchronization can allow the family of robots to maintain a spatial relationship before, during, and after the handling of a condition that stops motion.

The guide rules can define the behavior when a motion or process is resumed after first being stopped. The resume sequence can include all robots returning the position where motion was stopped. The rules could define returning to a position that is some distance along the program path before the position where the motion was stopped. The rules could define synchronizing the resumption of motion and processes along the nominal path. The rules could define the resumption of a process sequence during the motion to the stopped position in preparation for resumption of the process during the execution of nominal motion.

The guide rules can define time based synchronization. Many times the desired synchronization is the earliest time that all robots and processes in the system are ready. The guide rules can define that the family head will communicate the starting time, relative to a common time. This can allow for anticipation of communication delay. The communication from the family head can occur at periodic intervals. Each communication can include a portion of data from prior communications. This allows for occasional loss or delay of communication data without changing the performance of the system because the lost data can be recovered from subsequent communications.

Figure 3:
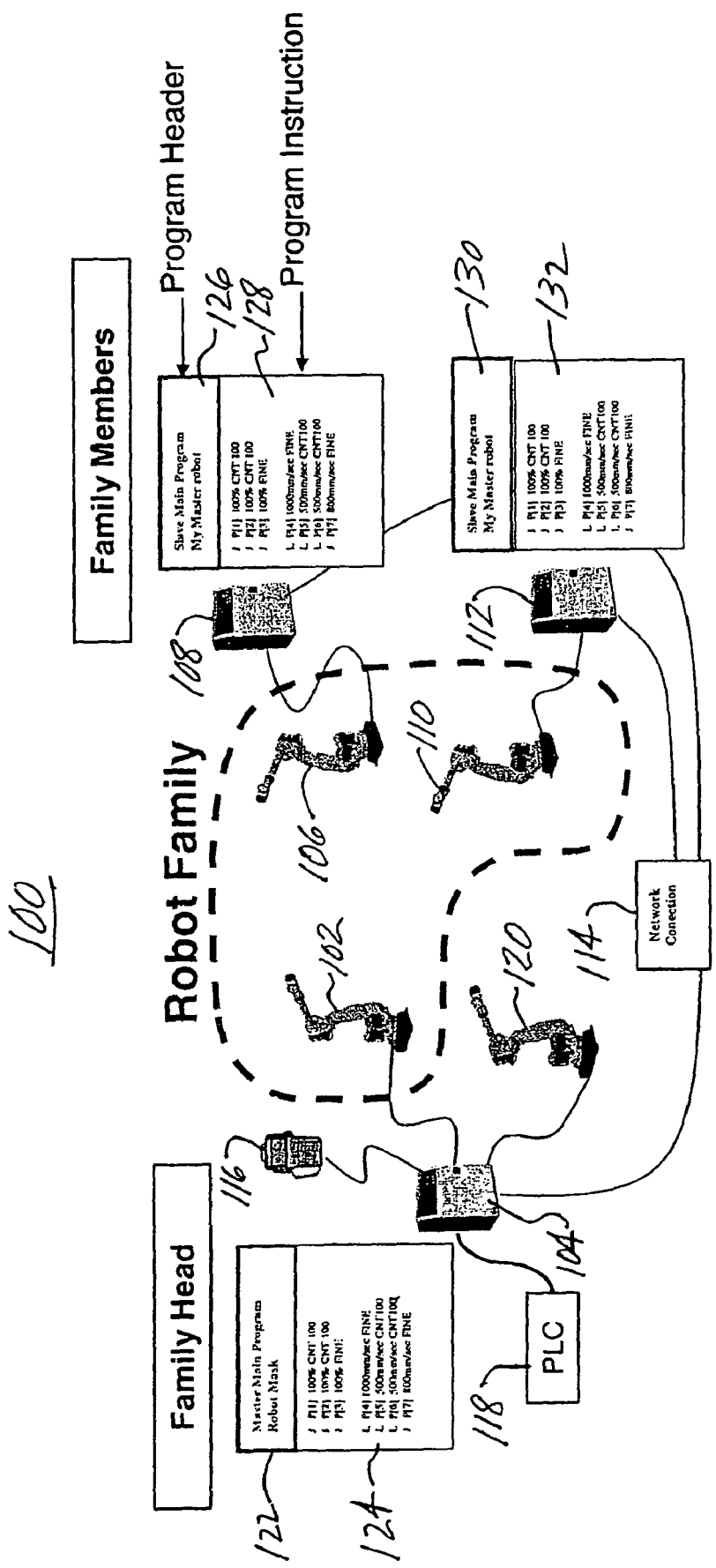
FIG. 3 shows a multiple robot system operating in accordance with the present invention.

There is shown in FIG. 3 a system 100 according to the present invention that involves synchronizing multiple robots during stopping motion and resume motion, and after robot motion has been interrupted. The system 100 includes a "Family Head" or master robot 102 connected to a controller 104, a first "Family Member" or slave robot 106 connected to a controller 108 and a second "Family Member" or slave robot 110 connected to a controller 112. The controllers 104, 108 and 112 are in communication via a means for exchanging data such as a network connection 114. The two slave robots 106 and 110 are illustrative only and the family can have one or more than two "Family Member" robots. Also, shown as connected to the master controller 104 are a teach pendant 116, a programmable logic controller (PLC) 118 and a robot 120 that is not a "Family Member".

The present invention involves synchronizing the multiple robots 102, 106 and 110 during stopping motion and resume motion in a system that uses the above-described technique of target tick count to synchronize multiple robots motion during normal motion execution before robot motion interruption occurs. The controller 104 has a master main control program stored therein that includes a program header 122 and a set of program instructions 124. The program header 122 identifies the robot 102 as the "Family Head". The controller 108 has a slave main control program stored therein that includes a program header 126 and a set of program instructions 128. The program header 126 identifies the robot 106 as a "Family Member". Similarly, the controller 112 has a slave main control program stored therein that includes a program header 130 and a set of program instructions 132. The program header 130 identifies the robot 110 as a "Family Member".

The system 100 according to the present invention synchronizes application processing and robot motion according to a set of the guide rules. For example, assume that the master robot 102 is a handling robot and the slave robot 106 is a spot welder robot. The master robot 102 prepares a motion command ahead of the actual motion start time, by an amount at least greater than the network communication delay through the network connection 114. The master robot 102 stores the motion command in a memory area. The master robot 102 then broadcasts a target tick count and motion command to the slave robot 106. The slave robot 106 receives and stores the target tick count and the motion command. The master robot 102 starts to retrieve the stored motion command and execute the motion command as soon as the target tick count is reached. The slave robot 106 starts to retrieve and use the stored motion command to generate coordinated motion relative to the master robot 102 as soon as the current shadow tick count matches the target tick count specified by the master robot. The slave robot motion is relative to the master, and is time aligned to the master robot motion through the use of a start target tick count.

Figure 4:
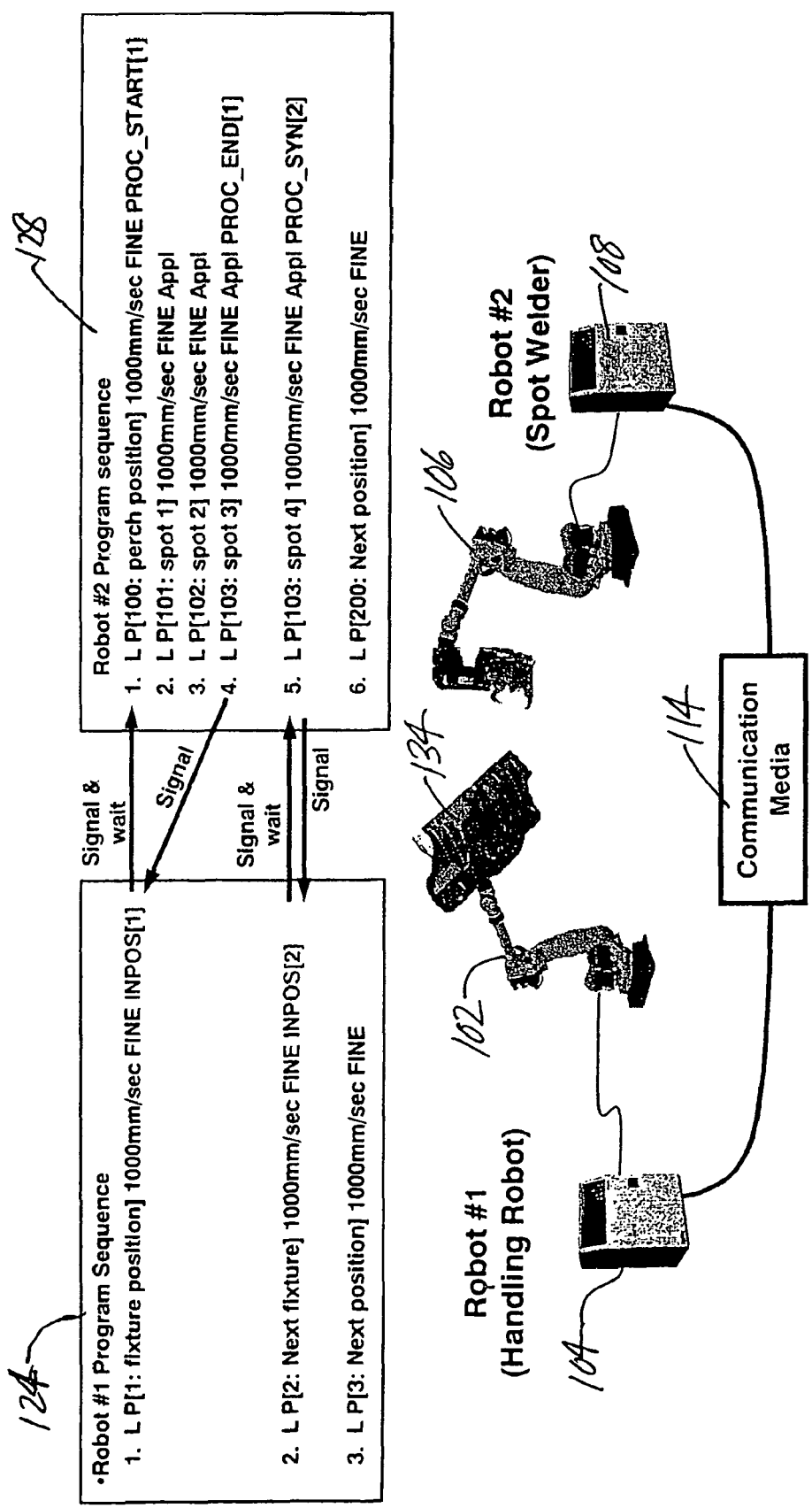
FIG. 4 shows process synchronization between the master robot and one of the slave robots of the system shown in FIG. 3.

The process synchronization according to the present invention is illustrated in FIG. 4. In the example wherein the master robot 102 is a handling robot and the slave robot 106 is a spot welder robot, the slave robot 106 waits for the master robot 102 to bring a part 134 into a processing position according to a step 1 in the program instructions 128. The master robot controller 104 signals the slave robot controller 108 when the part is in position and waits for the slave robot to finish the spot welding application process according to a step 1 in the program instructions 124. The slave robot 106 performs the application processing and then the slave robot controller 108 signals the master robot controller 104 upon finishing according to steps 2, 3 and 4 in the program instructions 128. Step 2 in the program instructions 124 and step 5 in the program instructions 128 represent another spot welding task. Both robots then proceed to the next step in the program represented by a step 3 in the program instructions 124 and a step 5 in the program instructions 128.

In order for all robots in the family to achieve accurate motion synchronization and coordination when the motion of any robot in the family is being interrupted, such as by a hold signal, it is desirable for all of the robots to stop motion at the same time. As explained above, when the family of robots operates in a communication network, there is an inherent delay between the time that one controller generates a signal and the time another controller receives that signal. This is true whether the network is wireless, an Ethernet, or a bus connecting two processors. Thus, the guide rules according to the present invention allow multiple robots in a family to stop motion at the same time.

Figure 5:
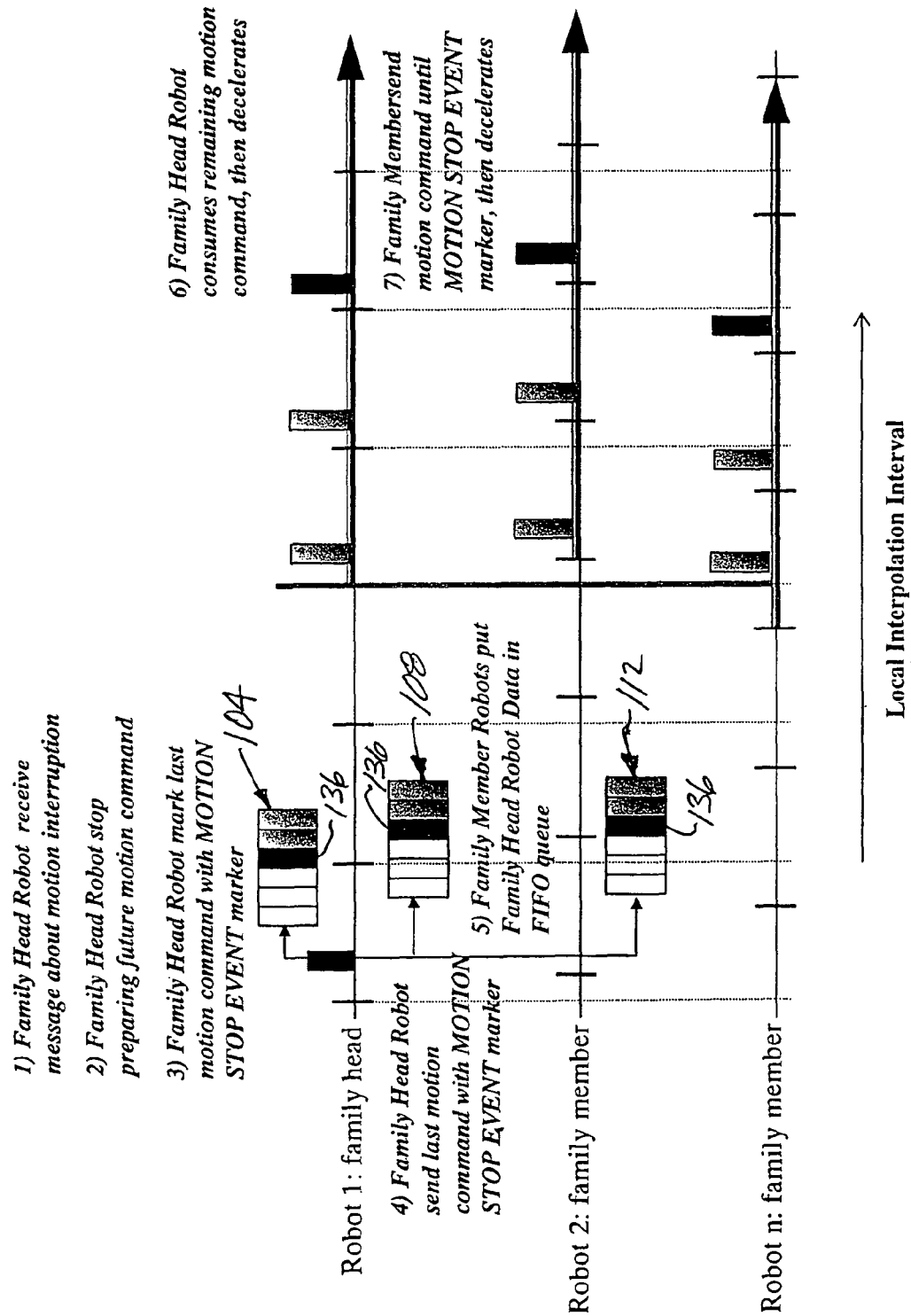
FIG. 5 is a timing diagram of the stop and resume synchronization of the robot system shown in FIG. 3.

FIG. 5 is a timing diagram of the motion stop and resume synchronization of the robot family according to a set of the guide rules. When the motion of any robot is interrupted, all of the other robots in the family are informed of the interruption by a message transmitted through the network connection 114. In a step 1) shown in FIG. 5, the "Family Head" or master robot controller 104 receives the message about motion interruption. In response to the message, the master robot controller 104 stops preparing the future motion command in a step 2). Then the master robot controller 104 marks a last motion command 136 in memory with a MOTION STOP EVENT marker in a step 3) to indicate the last motion command before motion deceleration starts. The master robot controller 104 sends the marked last motion command 136 over the network connection 114 to the slave robot controllers 108 and 112 in a step 4). The slave robot controllers 108 and 112 store the command 136 in a FIFO queue in a step 5).

The master robot controller 104 executes the motion commands remaining in its queue until the motion command 136 begins deceleration of the master robot 102 in a step 6). The slave robot controllers 108 and 112 also execute the motion commands remaining in the respective queues until the motion command 136 begins deceleration of the slave robots 106 and 110 in a step 7). The deceleration motion commands can be generated so as to control the rate of deceleration of each robot in accordance with the robot having the longest deceleration time. Thus, all of the robots in the family decelerate with the same motion deceleration time and all robot controllers remember the last motion command 136 for use later during motion resumption.

Figure 6:
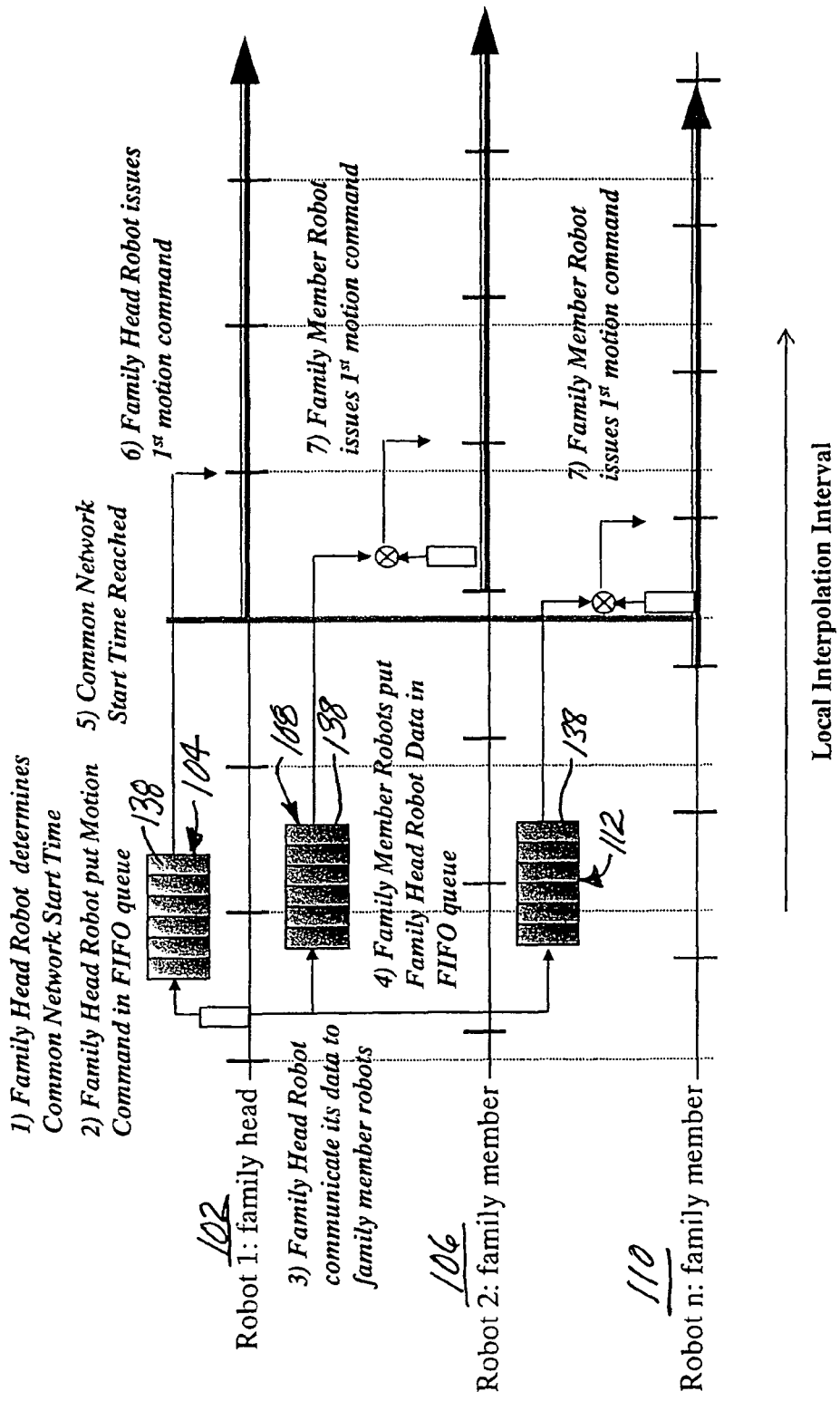
FIG. 6 is a timing diagram of the motion start synchronization of the robot system shown in FIG. 3.

After all of the robots come to a complete stop, an operator may jog one or more of the robots away from the stopping position for repair or clean up operations. Then the operator puts the robots back in automatic operation for a start motion resume sequence. It is desirable for all robots to return to the stopping position before resuming travel along the original path. FIG. 6 is a timing diagram of the motion start synchronization of the robot family according to a set of the guide rules. The master controller 104 determines a common network start time in a step 1). The start time is a time in the future with a duration at least longer than the network communication delay time. The master controller 104 stores a first motion command 138 in the FIFO queue in a step 2) but does not start motion of the master robot 102. The motion command 138 and common start time are transmitted through the network connection 114 to the slave controllers 108 and 112 in a step 3). The slave controllers 108 and 112 store the motion command in the associated FIFO queues in a step 4).

When the common network time is reached in a step 5) and the master robot controller 104 issues the first motion command 138 in a step 6) to the master robot 102. In response to the common network time, the slave robot controller 106 issues the first motion command 138 to the slave robot 106 and the slave robot controller 112 issues the first motion command 138 to the slave robot 110 in a step 7). As a result, all of the robots in the family are synchronized to start within one interpolation interval.

Figure 7:
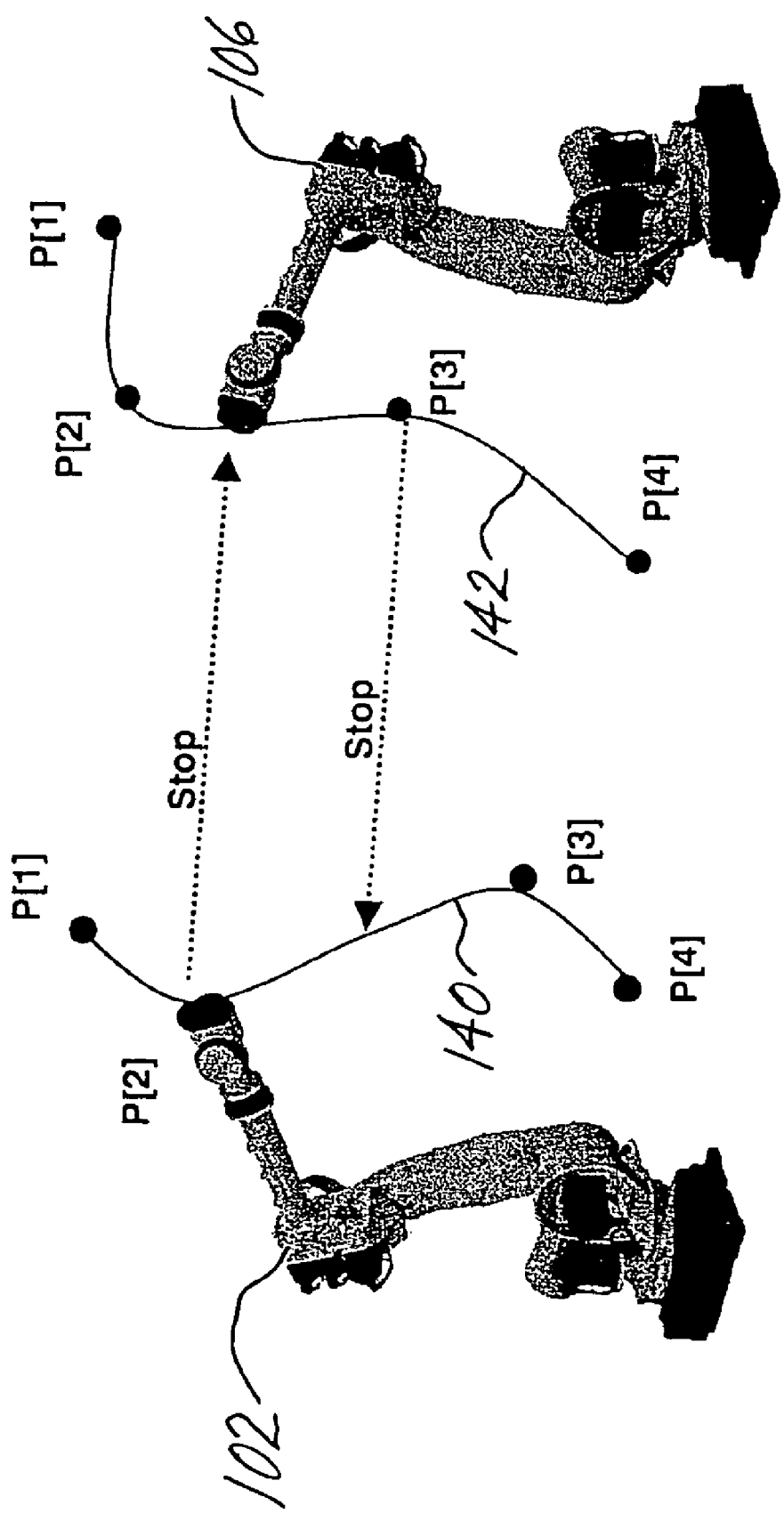
FIG. 7 is an illustration of single step operation of the master robot and one slave robot shown in FIG. 3.

FIG. 7 shows single step synchronized operation of the robots 102 and 106 according to the present invention during teaching or process setup. The master robot 102 is to move a free end of the robot arm along a path 140 while the slave robot is to move along a path 142. The master robot 102 starts at a point P[1] and moves to points P[2], P[3] and P[4] in succession along the path 140. In a similar manner, the slave robot 106 starts at a point P[1] and moves to points P[2], P [3] and P[4] in succession along the path 142. Both robots will pause or stop whenever one of the robots finishes the execution of a line of the control program. For example, when the master robot 102 reaches the point P[2] on the path 140, the slave robot 106 will immediately stop on the path 142 between the points P[2] and P[3]. When the slave robot 106 reaches the point P[3] on the path 142, the master robot 102 will immediately stop on the path 140 between the points P[2] and P[3].

Figure 8:
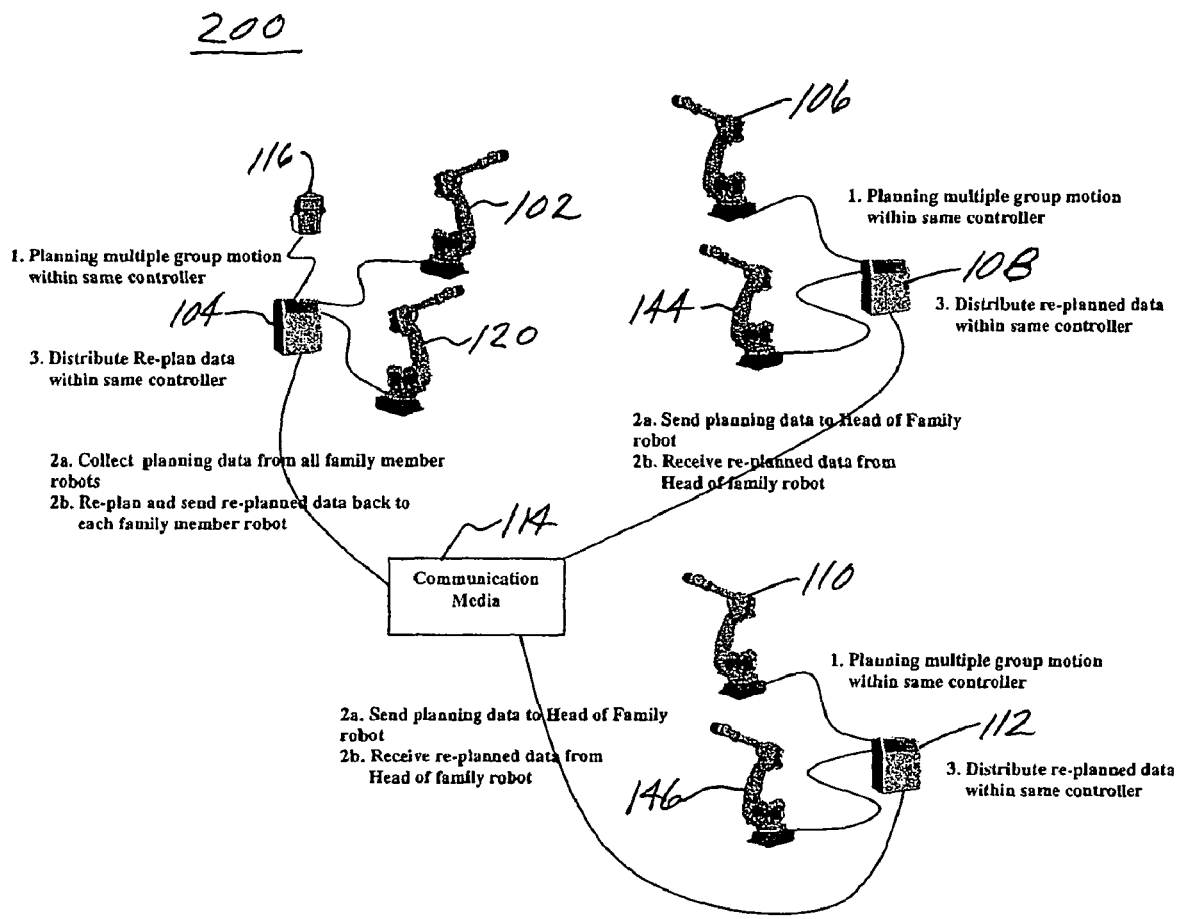
FIG. 8 is a schematic diagram of an alternate embodiment of the multiple robot system shown in FIG. 1 for multiple group motion.

FIG. 8 shows a system 200 according to the present invention that involves synchronizing multiple robots for group motion. The system 200 includes the following devices from the system 100 shown in FIG. 3: the robot 102 connected to the controller 104; the robot 106 connected to the controller 108; the robot 110 connected to the controller 112; the network connection 114; the teach pendant 116; and the robot 120 (now included in the family) connected to the controller 104. Added to the system 100 are a family robot 144 connected to the controller 108 and a family robot 146 connected to the controller 112. Also shown in FIG. 8 is a set of guide rules for synchronizing the start and end time of multiple robot motion from multiple controllers.

The guide rules define three steps for each robot for simultaneous motion re-planning. The controller 104 connected to the "Family Head" or master robot 102 plans multiple group motion within the same controller in a step 1. The controller 104 collects planning data from all family member robots in a step 2a, and re-plans the motion and sends the re-planned data back to all of the family member robots in a step 2b. In a step 3 the re-planned data is distributed within the controller 104 for controlling motion of the robots 102 and 120.

The controller 108 connected to the slave robots 106 and 144 plans multiple group motion within the same controller in a step 1. The controller 108 sends the planning data to the controller 104 in a step 2a. The controller 108 receives the re-planned data from the controller 104 in a step 2b. In a step 3 the re-planned data is distributed within the controller 108 for controlling motion of the robots 106 and 144. The same process is performed by the controller 112 for controlling motion of the robots 110 and 146.

The guide rules provide for synchronization in response to an external input. For Example, referring to FIG. 1, the teach pendant 116 is an external device that can be used in a single teach pendant operation to teach each of the robots 102, 106 and 110. Although the teach pendant 116 is shown as being connected to the controller 104, it could be connected to either of the controllers 108 and 112. The network connection 114 permits the teach pedant 116 to be used for information (speed override, step, hold, reset, error, etc.) distribution in the family, program selection, shift forward/backward operation, single step operation and remote login/jogging to operate the slave robots.

In summary, the guide rules according to the present invention perform the following functions:
1. Define the robots in the family
2. Process synchronization
3. Handle exceptions (errors)
4. Forward program execution
5. Backward program execution
6. Line-by-line program synchronization
7. Motion synchronization The system and method according to the present invention perform guided programming of a family of computer controlled machines (robots) with programs wherein associated with each of the programs is a data area applicable to the execution of the program. Established in the data area is set of the guide rules that direct the execution of the program according to the type of program to be executed. The programs are executed such that the robots operate according to the established guide rules in a coordinated manner.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A system for motion synchronization and coordination of a family of robots including at least two robot arms comprising:
a master robot arm connected to a master controller having a data area in which robot family information is stored;
at least one slave robot arm connected to a slave controller having a data area in which said robot family information is stored;
a network connection between said master controller and said at least one slave controller for transmitting signals; and
a master program stored in said data area of said master controller and a slave program stored in said data area of said at least one slave controller, said master program and said slave program each containing program instructions to be executed for coordinated operations of said master robot arm and said at least one slave robot arm respectively, wherein said robot family information identifies said master robot arm and said at least one slave robot arm as members of a robot family for execution of each of the program instructions to perform the coordinated operations with motion synchronization, and wherein in response to a first said program instruction having a first motion duration to be performed by said master robot arm in motion synchronization with a second said program instruction having a second motion duration to be performed by said slave robot arm, said first and second motion durations being different, said master program changes a shorter one of said first and second motion durations to a longer one of said first and second motion durations whereby said master robot arm and said at least one slave robot arm start and stop motion according to said first and second program instructions with a common duration.

2. The system according to claim 1 wherein said robot family information is stored in a header of said master program and in a header of said slave program.

3. The system according to claim 1 including means for generating a master tick count from said master controller and means for generating a shadow tick count from said slave controller, said shadow tick count representing said master tick count as a common time reference.

4. The system according to claim 3 wherein said master controller and said slave controller execute said program instructions in coordination with a predetermined integer of said master tick count and a generation of an integer of said shadow tick count closest to said predetermined integer.

5. The system according to claim 1 including a set of guide rules stored in at least one of said master controller and said slave controller and wherein said master controller and said slave controller execute said program instructions according to said set of guide rules.

6. The system according to claim 5 wherein said master controller and said slave controller synchronize stopping of movement of said master robot arm and said at least one slave robot arm based upon a longer one of associated deceleration times according to said set of guide rules.

7. The system according to claim 5 wherein said master controller and said slave controller synchronize resumption of movement of said master robot arm and said at least one robot arm after a stop based upon a common start time according to said set of guide rules.

8. The system according to claim 5 wherein said master controller and said slave controller synchronize single step operation of said master robot arm and said at least one slave robot arm according to said set of guide rules.

9. A method of controlling motion synchronization and coordination of a family of robots having at least one controller, at least two robot arms and associated control programs comprising the steps of:
connecting a controller with a means for exchanging data;
storing the associated control program having program instructions for each of the at least two robot arms in a data area in the controller;
storing in the controller a plurality of guide rules that direct execution of the associated control programs;
selecting a set of the guide rules from the plurality of guide rules according to the type of the associated control program; and
executing the associated control programs according to the set of guide rules to generate data through the network connection to synchronize and coordinate motion of the at least two robot arms, wherein in response to a first one of the program instructions having a first motion duration to be performed by one of the at least two robot arms in motion synchronization with a second one of the program instructions having a second motion duration to be performed by another one of the at least two robot arms, the first and second motion durations being different, changing a shorter one of the first and second motion durations to a longer one of the first and second motion durations whereby the at least two robot arms start and stop motion according to the first and second program instructions with a common duration.

10. The method according to claim 9 wherein the at least two robot arms comprise a family of robots with one of the robot arms being a family head robot and another of the robot arms being a family member robot.

11. The method according to claim 9 wherein the data area is part of a program header of each of the associated control programs and the program header identifies the at least two robot arms as being included a robot family.

12. The method according to claim 9 including synchronizing at least one of motion of the at least two robot arms and application processes performed by the at least two robot arms.

13. The method according to claim 12 including synchronizing the motion at at least one of a start and an end of the motion.

14. The method according to claim 12 including synchronizing the application processes at at least one of a start and an end of the application processes.

15. The method according to claim 9 including performing at least one of forward program execution and backward program execution according to the guide rules.

16. The method according to claim 9 including responding to an external input to synchronize operation of the at least two robot arms.

17. The method according to claim 9 including communicating the data during successive intervals wherein the data which might be lost due to a communication failure during one of the intervals is available for recovery from at least one subsequent one of the intervals.

18. The method according to claim 9 wherein the guide rules include rules for synchronization of at least one of a motion stopping sequence, a start of motion deceleration, an end of motion deceleration, a resume sequence, a returning to positions where motion was stopped and exception handling.

19. The method according to claim 18 wherein the synchronization of exception handling includes communicating exception information between the at least two robots.

20. The method according to claim 9 including generating tick counts to account for delay in the communication of the data through the means for exchanging data.

21. The method according to claim 9 including communicating the data through the means for exchanging data at periodic intervals.

22. A system for motion synchronization and coordination of a family of robots including at least two robot arms comprising:

- a master robot arm connected to a master controller having a data area in which robot family information is stored;
- at least one slave robot arm connected to a slave controller having a data area in which said robot family information is stored;
- a network connection between said master controller and said at least one slave controller for transmitting signals;
- a master program stored in said data area of said master controller and a set of slave programs stored in said data area of said at least one slave controller, said master program and said set of slave programs each containing program instructions to be executed for coordinated operations of said master robot arm and said at least one slave robot arm respectively, and wherein said robot family information identifies said master robot arm and said at least one slave robot arm as members of a robot family for execution of each of the program instructions related to the coordinated operations; and
- a set of guide rules stored in at least one of said master controller and said slave controller, wherein said master controller and said slave controller execute said program instructions according to said set of guide rules, and wherein said master controller and said slave controller synchronize at least one of stopping of movement of said master robot arm and said at least one slave robot arm based upon a longer one of associated deceleration times according to said set of guide rules, resumption of movement of said master robot arm and said at least one robot arm after a stop based upon a common start time according to said set of guide rules, and single step operation of said master robot arm and said at least one slave robot arm with simultaneous pausing or stopping according to said set of guide rules.

\* \* \* \* \*